US012348083B2

United States Patent
Seki et al.

(10) Patent No.: US 12,348,083 B2
(45) Date of Patent: Jul. 1, 2025

(54) ELECTRIC MOTOR STATOR AND ELECTRIC MOTOR

(71) Applicant: IHI Corporation, Tokyo (JP)

(72) Inventors: Naoki Seki, Tokyo (JP); Fuminori Suzuki, Tokyo (JP)

(73) Assignee: IHI Corporation, Tokyo (JP)

( * ) Notice: Subject to any disclaimer, the term of this patent is extended or adjusted under 35 U.S.C. 154(b) by 234 days.

(21) Appl. No.: 17/882,686

(22) Filed: Aug. 8, 2022

(65) Prior Publication Data

US 2022/0385123 A1     Dec. 1, 2022

Related U.S. Application Data

(63) Continuation of application No. PCT/JP2021/006975, filed on Feb. 25, 2021.

(30) Foreign Application Priority Data

May 15, 2020 (JP) ................. 2020-086027

(51) Int. Cl.
 *H02K 1/20* (2006.01)
 *H02K 1/16* (2006.01)
 *H02K 3/12* (2006.01)
 *H02K 3/24* (2006.01)

(52) U.S. Cl.
 CPC ............. *H02K 1/20* (2013.01); *H02K 1/16* (2013.01); *H02K 3/12* (2013.01); *H02K 3/24* (2013.01)

(58) Field of Classification Search
 CPC .. H02K 1/16; H02K 1/20; H02K 3/12; H02K 3/24
 See application file for complete search history.

(56) References Cited

U.S. PATENT DOCUMENTS

| 5,866,959 | A | 2/1999 | Le Flem | |
| 2010/0164319 | A1* | 7/2010 | Metsberg | H02K 3/18 29/596 |
| 2011/0221286 | A1* | 9/2011 | Uchiyama | H02K 1/20 310/54 |

(Continued)

FOREIGN PATENT DOCUMENTS

| EP | 3 588 743 A1 | 1/2020 |
| JP | 10-234157 A | 9/1998 |

(Continued)

OTHER PUBLICATIONS

International Search Report issued Apr. 20, 2021 in PCT/JP2021/006975 filed on Feb. 25, 2021, 2 pages.

(Continued)

*Primary Examiner* — Jue Zhang (74) *Attorney, Agent, or Firm* — Oblon, McClelland, Maier & Neustadt, L.L.P.

(57) ABSTRACT

Provided is a stator including a coil of a winding of a flat wire conductor, a stator core including a slot for housing a part of the coil, and a flow passage part through which a coolant flows, provided between a wall part of the slot and an outer surface of the coil facing the wall part. The extension shape of the flow passage part from an inlet to an outlet for the coolant changes along the axial direction of the stator core. The flow passage part is, for example, a concave part formed on the wall part of the slot.

16 Claims, 8 Drawing Sheets

(56) References Cited

U.S. PATENT DOCUMENTS

2020/0235625 A1* 7/2020 Hishida .................. H02K 3/24

FOREIGN PATENT DOCUMENTS

| JP | 11-103549 A | 4/1999 | | |
|---|---|---|---|---|
| JP | 11-234157 A | 8/1999 | | |
| JP | 2004-242368 A | 8/2004 | | |
| WO | WO-2018154944 A1 * | 8/2018 | ............... | H02K 1/20 |

OTHER PUBLICATIONS

Japanese Office Action issued on Jun. 13, 2023 in Japanese Patent Application No. 2022-522526, 2 pages.
Extended European Search Report issued May 29, 2024, in corresponding European Patent Application No. 21804818.9, 10 pages.

* cited by examiner

ELECTRIC MOTOR STATOR AND ELECTRIC MOTOR

CROSS REFERENCE TO RELATED APPLICATIONS

This application is a continuation application of International Application No. PCT/JP2021/006975, filed on Feb. 25, 2021, which claims priority to Japanese Patent Application No. 2020-086027, filed on May 15, 2020, the entire contents of which are incorporated by reference herein.

BACKGROUND

1. Technical Field

The present disclosure relates to a stator for an electric motor and an electric motor using the stator.

2. Description of the Related Art

A conventional electric motor has a cooling mechanism for cooling a stator using a coolant. Japanese Unexamined Patent Application Publication No. 2004-242368 (Patent Literature 1) discloses a stator for an electric motor. The stator includes multiple teeth portions for each of which a winding is formed by winding a flat wire conductor in multiple rows, and a coolant flow passage is provided between the windings.

SUMMARY

In the stator disclosed in Japanese Unexamined Patent Application Publication No. 2004-242368, a winding is formed in rows for each teeth portion, and there is room for further improvement to increase the cooling efficiency.

An object of the present disclosure is to provide a stator advantageous for improving the cooling efficiency, and an electric motor using the stator.

A stator according to a first aspect of the present disclosure includes a coil of a winding of a flat wire conductor, a stator core including a slot for housing a part of the coil, and a flow passage part through which a coolant flows, provided between a wall part of the slot and an outer surface of the coil facing the wall part, wherein an extension shape of the flow passage part from an inlet to an outlet for the coolant changes along an axial direction of the stator core.

In the above-described stator, the flow passage part may be a concave part formed on the wall part of the slot. The wall part of the slot includes a wall surface adjacent to the concave part, the wall surface contacting with the coil through an insulating member. The above-described stator may include a spacer between the wall part of the slot and the outer surface of the coil facing the wall part, wherein the flow passage part may be a concave part formed on an outer peripheral part of the spacer. The concave part may be formed on the outer peripheral part of the spacer, the outer peripheral part facing the outer surface of the coil, and the outer peripheral part of the spacer includes an outer peripheral surface adjacent to the concave part, the outer peripheral surface contacting with the coil. The flat wire conductor may be stacked in layers along a radial direction orthogonal to the axial direction of the stator core, and the concave part is arranged as a plurality of concave parts, and the plurality of concave parts are opposed to each other for every layer of the flat wire conductor in the radial direction with a thickness of the flat wire conductor as one unit. The flow passage part may be a combination of a plurality of concave parts formed on a side surface part of the flat wire conductor. The side surface part of the flat wire conductor includes a side surface adjacent to each of the concave parts, the side surface contacting with the wall part of the slot through an insulating member. The flat wire conductor may be stacked in layers along a radial direction orthogonal to the axial direction of the stator core, and each of the concave parts may be formed with a thickness of the flat wire conductor as one unit in the radial direction.

A stator according to a second aspect of the present disclosure includes a coil of a winding of a flat wire conductor, a stator core including a plurality of electromagnetic steel plates axially stacked and a slot for housing a part of the coil, and a flow passage part through which a coolant flows, formed on a wall part of the slot, wherein the electromagnetic steel plates include a plurality of concave parts formed thereon, the plurality of concave parts each having a thickness of each of the electromagnetic steel plates as one unit, the flow passage part includes a flow passage formed with a combination of the concave parts, and the concave parts are different in position, size, or number between the electromagnetic steel plates.

In the above-described stator, the flat wire conductor may be stacked in layers along a radial direction orthogonal to the axial direction of the stator core, and a combination pattern of the concave parts may be defined in the radial direction with a thickness of the flat wire conductor as one unit. A combination pattern of the concave parts may be defined by stacking a first set of multiple electromagnetic steel plates having the same position, size, and number of concave parts and a second set of multiple electromagnetic steel plates having the same position, size, and number of concave parts, and at least one of the position, the size, or the number is different between the concave parts included in the first set and the concave parts included in the second set.

A stator according to a third aspect of the present disclosure includes a coil of a winding of a flat wire conductor, a stator core including a slot for housing a part of the coil, and a flow passage part through which a coolant flows, formed on a side surface part of the flat wire conductor, wherein the flow passage part is a combination of a plurality of concave parts formed on the flat wire conductor.

In the above-described stator, the flat wire conductor may be stacked in layers along a radial direction orthogonal to an axial direction of the stator core, and in the slot, a section of the flat wire conductor having concave parts formed thereon and a section of the flat wire conductor having no concave parts formed thereon may be stacked on each other.

An electric motor according to one aspect of the present disclosure includes a stator and a rotor configured to rotate with a magnetic field generated by the stator, wherein the stator is a stator described above.

DESCRIPTION OF THE EMBODIMENTS

Some exemplary embodiments are described with reference to the drawings. Here, the dimensions, materials, and specific numerical values illustrated in the respective embodiments are examples only and are not intended to limit the present disclosure unless specifically stated otherwise. Elements having substantially the same functions and configurations are denoted by the same reference numerals, and the description thereof is omitted. Elements not directly related to the present disclosure are omitted from the drawings.

(Electric Motor)

Figure 1:
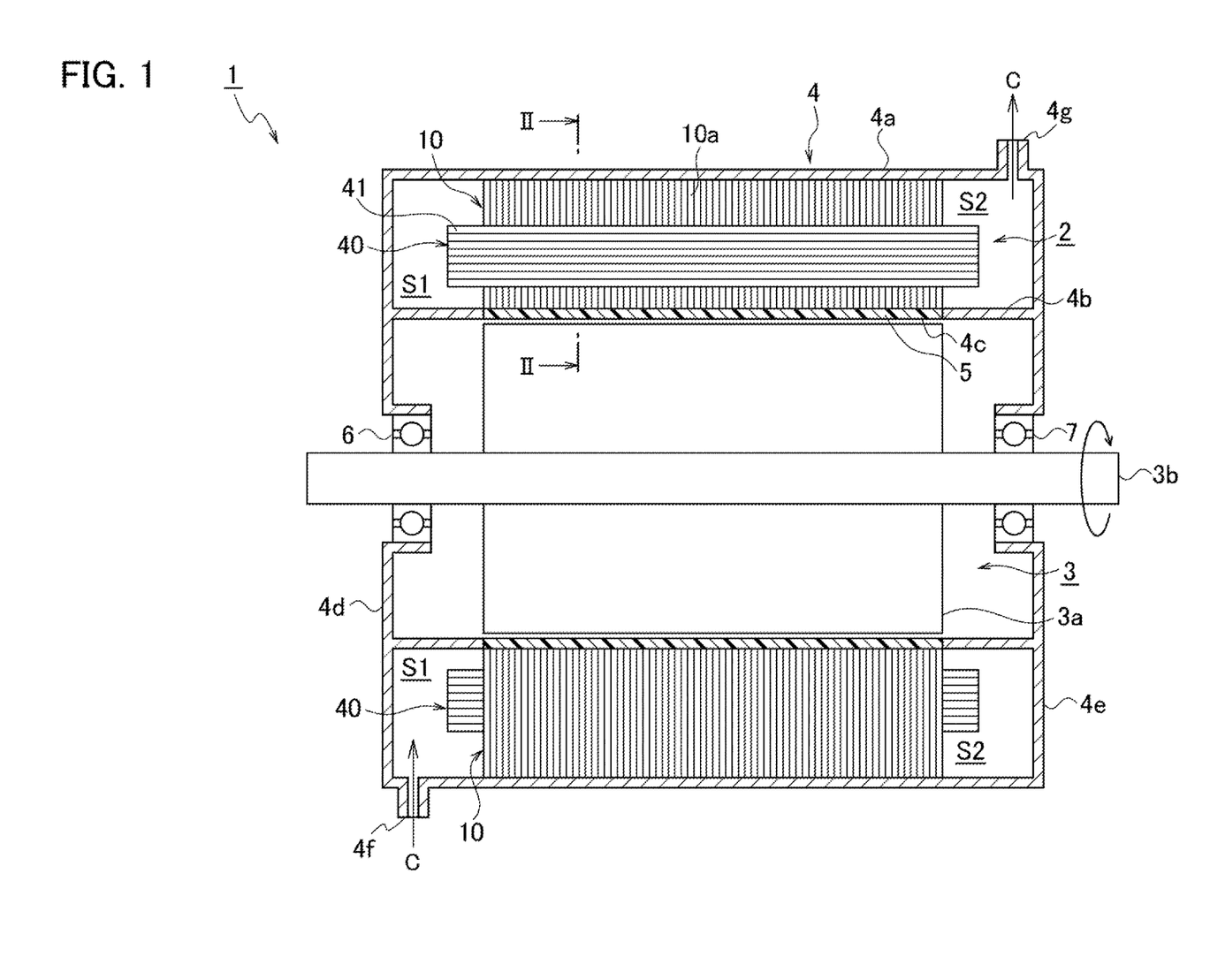
FIG. 1 is a side view illustrating a configuration of an electric motor according to some embodiments of the present disclosure.

FIG. 1 is a sectional view of the configuration of an electric motor 1 according to some embodiments, the electric motor 1 including any of the stators described in detail below. The electric motor 1 includes a stator 2, a rotor 3, and a case 4. The electric motor 1 makes the rotor 3 rotate using a magnetic field generated in the stator 2. The electric motor 1 according to the present embodiment includes a cooling mechanism through which a coolant C flows, thereby cooling the stator 2.

The stator 2 includes a stator core 10 and a coil 40. Note that in FIG. 1, the stator core 10 drawn above the rotor 3 is a cross section including the coil 40. In contrast, the stator core 10 drawn below the rotor 3 is a cross section not including the coil 40. The stator core 10 has a tubular shape as a whole and is a stacked body formed by stacking multiple electromagnetic steel plates 10a in the axial direction, each of which is a board made from a magnetic body. The coil 40 is a winding formed by winding a flat wire conductor 41 in multiple layers. The stator 2 according to the present embodiment includes a flow passage part through which the coolant C flows, and the specific structure and the like of the stator 2 is described in detail below.

The rotor 3 is arranged in an inner space of the stator 2 and includes an armature core 3a in a cylindrical shape formed by stacking multiple electromagnetic steel plates, not illustrated, in the axial direction, and a rotating shaft 3b. The armature core 3a has a permanent magnet, which is not illustrated. The rotating shaft 3b is press-fitted in an insertion hole formed in an axial center part of the armature core 3a.

The case 4 houses the stator 2 and the rotor 3 inside with at least one end of the rotating shaft 3b exposed to the outside. The case 4 is made from metal and has an outer peripheral wall part 4a, an inner peripheral wall part 4b, a first bottom wall part 4d, and a second bottom wall part 4e. The outer peripheral wall part 4a is a tubular member for connecting and holding the stator 2 by press-fitting the outer peripheral part of the stator 2 therein. The inner peripheral wall part 4b is a tubular member having an outer diameter and an inner diameter, which is inside the outer peripheral wall part 4a and is in a space between the stator 2 and the rotor 3. The inner peripheral wall part 4b has a hole part 4c at a position substantially opposed to the inner peripheral part of the stator core 10. The hole part 4c is filled with a resin wall 5. Here, the resin wall 5 covering the hole part 4c is in contact with the stator core 10 and is not in contact with the rotor 3. The first bottom wall part 4d is a member in a plate shape connected to one opening end of the outer peripheral wall part 4a and the inner peripheral wall part 4b through welding, for example. The first bottom wall part 4d is provided with a first bearing 6 in an opening part thereof through which the rotating shaft 3b penetrates. The first bearing 6 rotatably supports one end of the rotating shaft 3b. The second bottom wall part 4e is a member in a plate shape, which is opposed to the first bottom wall part 4d in the axial direction, and is connected to the other opening end of the outer peripheral wall part 4a and the inner peripheral wall part 4b through welding, for example. The second bottom wall part 4e is provided with a second bearing 7 in an opening part thereof through which the rotating shaft 3b penetrates. The second bearing 7 rotatably supports the other end of the rotating shaft 3b.

Since the stator 2 is arranged in a close manner to the outer peripheral wall part 4a and the inner peripheral wall part 4b as described above, the case 4 has formed therein a first annular space S1 facing one end of the stator core 10 in the axial direction and a second annular space S2 facing the other end of the stator core 10 in the axial direction. The case 4 includes an inflow port 4f in the outer peripheral wall part 4a, which communicates with the first annular space S1 and the outside, and through which the coolant C flows in from a coolant supply unit installed outside. In contrast, the case 4 includes an outflow port 4g in the outer peripheral wall part 4a, which communicates with the second annular space S2 and the outside, and through which the coolant C flows out to a coolant recovery unit provided outside. Since the stator 2 has the flow passage part through which the coolant C flows, the coolant C flowing in the first annular space S1 from the outside through the inflow port 4f is introduced from the first annular space S1 to the flow passage part in the stator 2. The coolant C flowing through the flow passage part in the stator 2 is then led to the second annular space S2 on the opposite side of the first annular space S1, and finally flows out of the second annular space S2 through the outflow port 4g. Due to the coolant C flowing in this manner, the electric motor 1 enables the heat generated in the coil 40 to be absorbed by the coolant C, thereby suppressing a temperature rise in the stator 2. That is, the entire flow passage of the coolant C including the flow passage part formed in the stator 2, the first annular space S1, and the second annular space S2 is the cooling mechanism included in the electric motor 1 according to the present embodiment.

Note that the coolant C which can be employed in the present embodiment is not limited, and various coolant such as gas including nitrogen gas and oil can be employed.

Stator According to a First Embodiment

Figure 2:
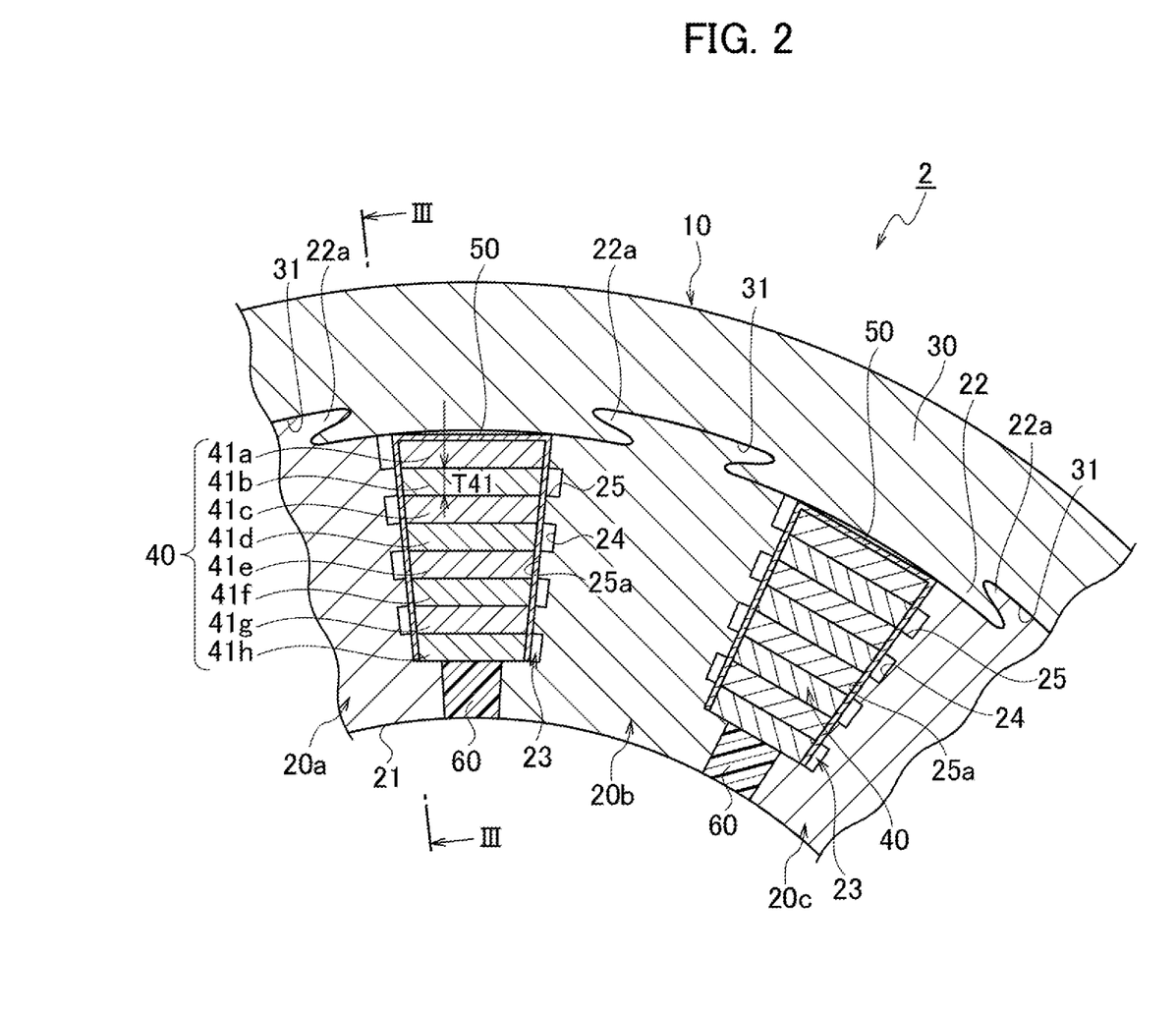
FIG. 2 is a cross-sectional view of a stator according to a first embodiment, corresponding to a part II-II in FIG. 1.

Next, the stator 2 according to the first embodiment is described, which can be applied to the electric motor 1 as exemplified above. FIG. 2 is a partial cross-sectional view of the stator 2 corresponding to the part II-II in FIG. 1, which is cut along a plane perpendicular to the axial direction. Note that FIG. 2 omits depictions of the case 4 and the resin wall 5. The stator 2 includes the stator core 10 and the coil 40 as described above.

The stator core 10 includes multiple slots 23 arranged along the axial direction of the stator 2 and each housing a part of the coil 40. The stator core 10 is formed by combining multiple core members to mount mutually continuous parts of the coil 40 in respective slots 23. In the present embodiment, the stator core 10 includes multiple teeth portions 20 and a single tubular portion 30. The multiple teeth portions 20 are arranged at equal distances to the central axis of the stator core 10 and at equal intervals from each other in the circumferential direction of the stator core 10. In this case, each slot 23 is a space formed between teeth portions 20 adjacent to each other. The tubular portion 30 holds the multiple teeth portions 20 combined in an annular form, at the inner peripheral side of the tubular portion 30. An inner peripheral surface 21 of the annular body formed by combining the teeth portions 20 faces the outer peripheral surface of the armature core 3a of the rotor 3. In contrast, an outer peripheral surface 22 of the annular body formed by combining the teeth portions 20 contacts with the inner peripheral surface of the tubular portion 30. Each of the teeth portions 20 includes a convex part 22a with the tip part wider than the base part on a surface facing the inner peripheral part of the tubular portion 30. In contrast, the inner peripheral part of the tubular portion 30 includes multiple concave parts 31, which are each capable of engaging with the convex part 22a provided in each of the teeth portions 20. Thus, it is possible for the tubular portion 30 to hold the respective teeth portions 20 in a stable manner.

Note that FIG. 2 exemplifies as a part of the stator core 10, two slots 23 adjacent to each other in the circumferential direction and three teeth portions forming these slots 23, that is, a first teeth portion 20a, a second teeth portion 20b, and a third teeth portion 20c.

The flat wire conductor 41 constituting the coil 40 is stacked in layers along the radial direction orthogonal to the axial direction of the stator core 10. FIG. 2 illustrates a case where the flat wire conductor 41 is stacked in a total of eight layers in one slot 23, as an example. That is, the flat wire conductor 41 in this example includes eight layers which are, in order from the outermost peripheral side toward the innermost peripheral side, a first layer 41a, a second layer 41b, a third layer 41c, a fourth layer 41d, a fifth layer 41e, a sixth layer 41f, a seventh layer 41g, and an eighth layer 41h. Hereinafter, the thickness of the flat wire conductor 41 is referred to as T41. The slots 23 each includes space opened from the inner peripheral surface 21 toward the rotor 3. After the coil 40 is installed in the slots 23, these spaces are filled with a resin material 60, and the coil is fixed in close contact with the slots 23.

The stator 2 includes an insulating member 50 installed between the stator core 10 and the coil 40 for each slot 23. The insulating member 50 is insulating paper, for example.

The stator 2 includes, for every slot 23, a flow passage part through which the coolant C flows from one end in the axial direction facing the first annular space S1 toward the other end in the axial direction facing the second annular space S2. The flow passage part is provided between a wall part of the slot 23 and an outer surface of the coil 40 facing the wall part. The wall part of the slot 23 here is basically a wall part facing the outer surface of the coil 40 in the circumferential direction of the stator core 10. The extension shape of the flow passage part from the inlet to the outlet for the coolant C in the stator core 10 changes along the axial direction of the stator core 10. That is, when the shapes of cross sections orthogonal to the axial direction are viewed along the axial direction, the cross-sectional shapes and positions of the flow passage part change along the axial direction. In other words, the cross-sectional shapes of the flow passage part may include a region that does not change partially in the axial direction.

Figure 3:
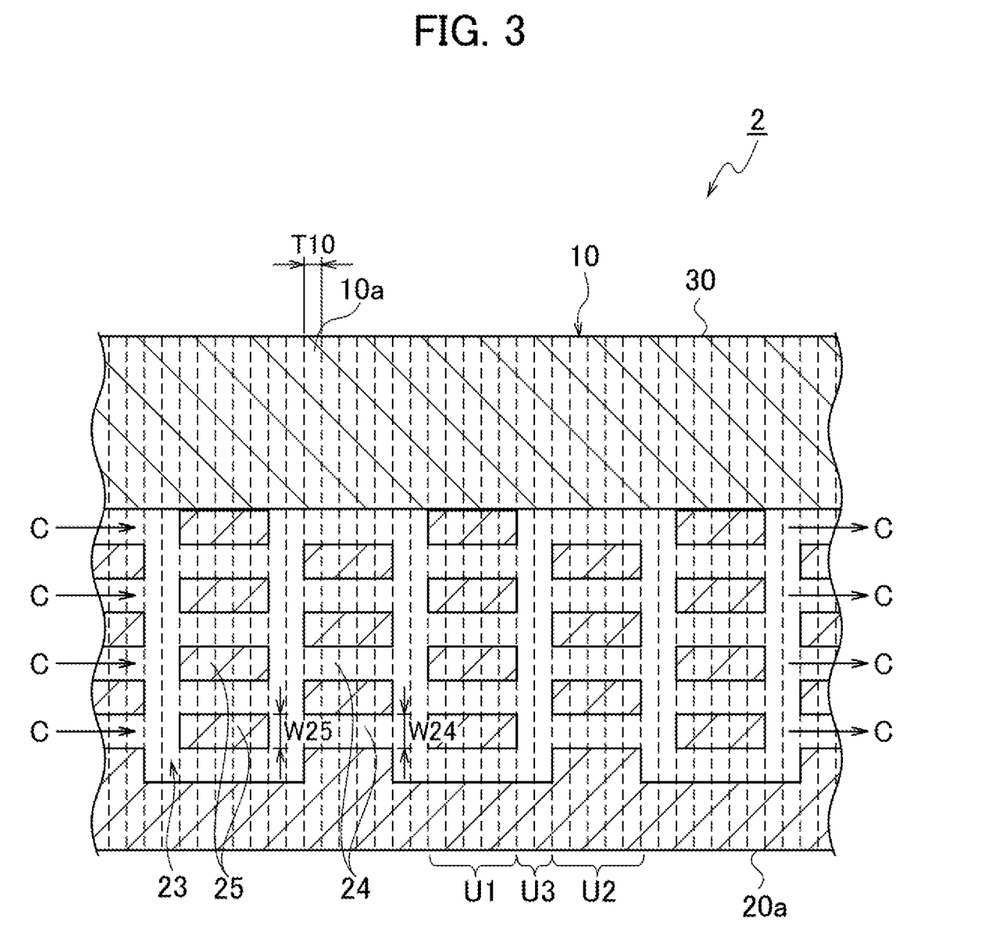
FIG. 3 is a cross-sectional view of a stator according to the first embodiment, corresponding to a part III-III in FIG. 2.

FIG. 3 is a partial cross-sectional view of the stator 2 corresponding to the part III-III in FIG. 2, which is cut along a plane along the axial direction and the radial direction orthogonal to the axial direction.

The flow passage part according to the present embodiment is constituted by concave parts 24 formed on the wall part of the slot 23. The shape of the concave parts 24 can be set in various ways as long as the condition that the extension shape changes along the axial direction of the stator core 10 is satisfied. In an example illustrated in FIG. 3, the shape of the concave parts 24, that is, the combination pattern of the concave parts 24, is defined according to the following criteria.

First, the combination pattern of the concave parts 24 may be defined in the radial direction orthogonal to the axial direction of the stator core 10 with the thickness T41 of the flat wire conductor 41 as one unit. For example, a width W24 of each concave part 24 in the radial direction is equal to the thickness T41 of the flat wire conductor 41. The concave parts 24 are opposed to each other in the radial direction for every layer of the flat wire conductor 41. For example, in FIG. 2, reference is made to the slot 23 between the first teeth portion 20a and the second teeth portion 20b. Among concave parts 24 formed on the first teeth portion 20a, four concave parts 24 on the part illustrated in FIG. 2 each face any of the side surfaces of the first layer 41a, the third layer 41c, the fifth layer 41e, and the seventh layer 41g of the flat wire conductor 41. In a similar manner, among the concave parts 24 formed on the second teeth portion 20b, four concave parts 24 in the part illustrated in FIG. 2 each face any of the side surfaces of the second layer 41b, the fourth layer 41d, the sixth layer 41f, and the eighth layer 41h of the flat wire conductor 41.

When the concave parts 24 are formed as described above, multiple convex parts 25 are adjacent to the concave parts 24 on the wall part of the slot 23. In other words, the convex parts 25 are parts remaining on the wall part of the slot 23 when the concave parts 24 are formed. In the present embodiment, wall surfaces adjacent to the concave parts 24 on the wall part of the slot 23, that is, wall surfaces 25a of the convex parts 25, contact with the coil 40 through the insulating member 50, as illustrated in FIG. 2. In this case, in the radial direction, the width W25 of each convex part 25 is equal to the thickness T41 of the flat wire conductor 41, and the convex parts 25 are opposed to each other for every layer of the flat wire conductor 41. For example, in FIG. 2, reference is made to the slot 23 between the first teeth portion 20a and the second teeth portion 20b. Among the wall surfaces 25a in the first teeth portion 20a, four wall surfaces 25a of the part illustrated in FIG. 2 each contact with any of the side surfaces of the second layer 41b, the fourth layer 41d, the sixth layer 41f, and the eighth layer 41h of the flat wire conductor 41 through the insulating member 50. In a similar manner, among the wall surfaces 25a in the second teeth portion 20b, four wall surfaces 25a of the part illustrated in FIG. 2 each contact with any of the side surfaces of the first layer 41a, the third layer 41c, the fifth layer 41e, and the seventh layer 41g through the insulating member 50.

Second, the combination pattern of the concave parts 24 may be defined in the axial direction of the stator core 10 with the thickness T10 of each of the electromagnetic steel plates 10a forming the stator core 10 as one unit. By combining concave parts 24 formed for a set of electromagnetic steel plates 10a, the flow passage part as a whole is formed. Note that the electromagnetic steel plates 10a are indicated by a broken line in FIG. 3. The thickness T10 of each electromagnetic steel plate 10a employed in the present embodiment is about 2 mm.

In the present embodiment, the condition that the extension shape of the concave parts 24 changes along the axial direction is satisfied by making the position, size, or number of the concave parts 24 different for each set of electromagnetic steel plates 10a. In the example illustrated in FIG. 3, the combination pattern of the concave parts 24 includes a first set U1, a second set U2, and a third set U3, each of which is composed of multiple electromagnetic steel plates 10a and has the same position, size, and number of the concave parts 24 formed. When the first set U1, the second set U2, and the third set U3 are compared with each other, the position, size, or number of concave parts 24 formed in each set is different among these sets.

Specifically, the first set U1 and the second set U2 are each a set of stacked five electromagnetic steel plates 10a of the same shape. Here, the first set U1 and the second set U2 have the same size and number (four in the present embodiment) of the concave parts 24, but the positions of the concave parts 24 are displaced from each other by the width W24 of each concave part 24 in the radial direction of the stator core 10. That is, the concave part 24 and the convex part 25 are alternately present in the axial direction. Meanwhile, the third set U3 is between the first set U1 and the second set U2. The concave part 24 included in the third set U3 has a shape in which the entire wall part of the slot 23 facing the entire side surface of the coil 40 is cut out. That is, the concave part 24 formed in the third set U3 connects the four concave parts 24 formed in the first set U1 with the four concave parts 24 formed in the second set U2.

With the combination pattern of the concave parts 24 defined as described above, the coolant C introduced into the concave parts 24 from one side of the stator 2 in the axial direction flows toward the other side of the stator 2 in the axial direction while changing the traveling direction in a complicated manner by repeating merging and branching.

Meanwhile, the extension shape of the flow passage part in the stator core 10 from the inlet to the outlet for the coolant C can be various other than the combination pattern of the concave parts 24 illustrated in FIG. 3.

Figure 4:
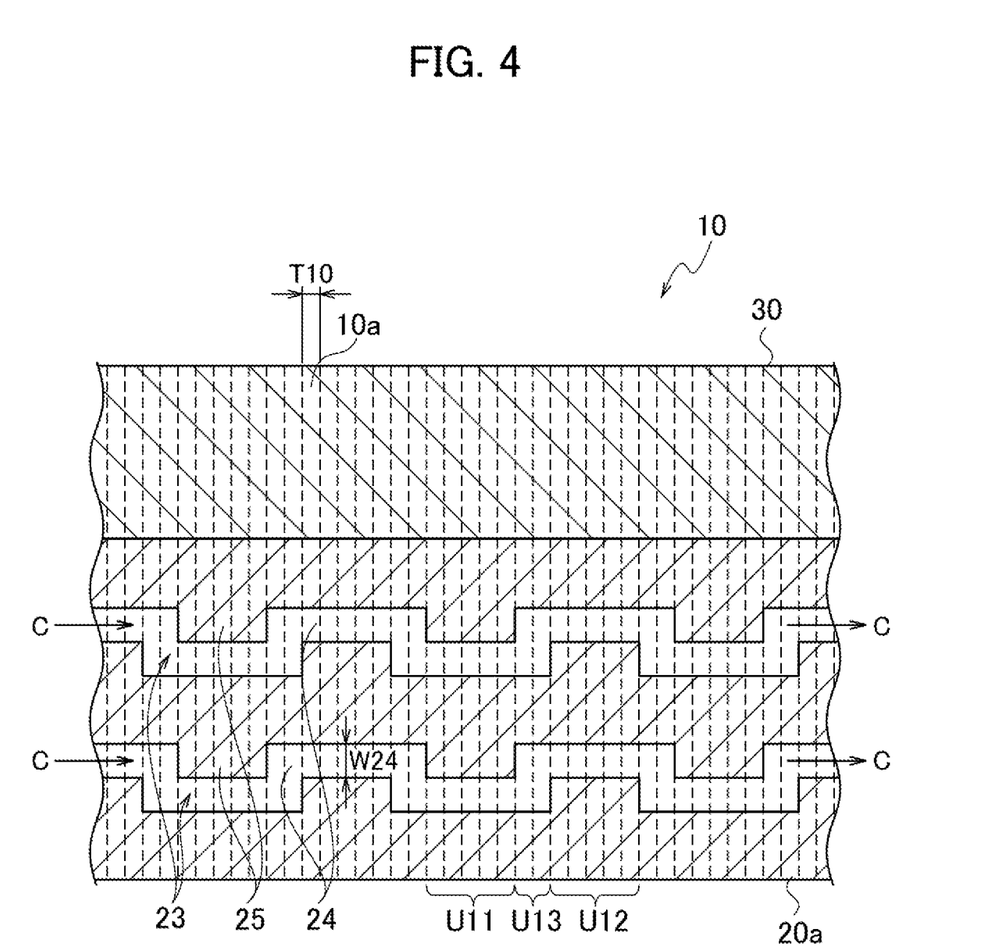
FIG. 4 is a cross-sectional view of a stator according to a modification of the first embodiment.

FIG. 4 is a diagram illustrating a combination pattern of the concave parts 24 as another example according to the present embodiment, in which the combination pattern of the concave parts 24 illustrated in FIG. 3 is modified. Note that FIG. 4 is a partial cross-sectional view of the stator 2 in accordance with FIG. 3.

As with the first set U1, second set U2, and third set U3 described above, in the example illustrated in FIG. 4, the combination pattern of the concave parts 24 includes a first set U1f, a second set U12, and a third set U13. Specifically, the first set U11 and the second set U12 are each a set of five stacked electromagnetic steel plates 10a of the same shape. Here, the first set U11 and the second set U12 have the same size and number (two in the present embodiment) of the concave parts 24, but the positions of the concave parts 24 are displaced from each other by the width W24 of each concave part 24 in the radial direction of the stator core 10. That is, the concave part 24 and the convex part 25 are alternately present in the axial direction. Meanwhile, the third set U13 is between the first set U11 and the second set U12. The concave part 24 included in the third set U13 has a shape necessary for connecting one concave part 24 formed in the first set U11 with one concave part 24 formed in the second set U12. In particular, the combination pattern of the concave parts 24 illustrated in FIG. 4 can include a part where the concave part 24 does not face any layers of the flat wire conductor 41. Referring to the drawing of FIG. 4, the wall part of the slot 23 in the first teeth portion 20a has no concave parts 24 formed at parts, which face any of the first layer 41a, the second layer 41b, the sixth layer 41f, and the seventh layer 41g of the flat wire conductor 41.

According to the combination pattern of the concave parts 24 illustrated in FIG. 4, the coolant C introduced into the concave parts 24 from one side of the stator 2 in the axial direction flows toward the other side of the stator 2 in the axial direction while meandering.

Next, the operation and effect of the stator 2 and the electric motor 1 using the stator 2 are described.

The stator 2 according to the present embodiment includes the coil 40 of a winding of the flat wire conductor 41, and the stator core 10 having the slots 23 for housing a part of the coil 40. The stator 2 includes the flow passage part through which the coolant C flows between the wall part of the slot 23 and the outer surface of the coil 40 facing the wall part. The extension shape of the flow passage part from the inlet to the outlet for the coolant C changes along the axial direction of the stator core 10.

First, the stator 2 enables the coolant C to flow through the flow passage part included in the stator core 10, and thus enables the heat generated in the coil 40 to be absorbed by the coolant C, thereby cooling the stator 2.

In the stator 2, the extension shape of the flow passage part from the inlet to the outlet for the coolant C changes along the axial direction of the stator core 10. Thus, the flow of the coolant C is more likely to be turbulence than in a case where the flow passage part extends linearly, for example, and the flow passage part is more likely to crawl widely to fit the outer surface shape of the coil 40, thereby improving the cooling efficiency.

As described above, the present embodiment provides the stator 2 advantageous to improve the cooling efficiency.

In the stator 2 according to the present embodiment, the flow passage part is provided between the wall part of the slot 23 and the outer surface of the coil 40 facing the wall part. Thus, as compared with a case where the flow passage part according to the present embodiment does not exist, there is no need to change the shape of components in the stator 2 to a large extent, or there is no need in some cases to increase the number of components in the stator 2.

The electric motor 1 according to the present embodiment includes the stator 2 and the rotor 3 to be rotated using a magnetic field generated by the stator 2.

The present embodiment provides the electric motor 1 advantageous to improve the cooling efficiency as the electric motor 1 includes the stator 2 achieving the effect described above. The electric motor 1 as described above can be advantageous for miniaturization and high output, accordingly.

In the stator 2, the flow passage part may be concave parts 24 formed on the wall part of the slot 23.

In the stator 2 described above, since the concave parts 24 are formed on the wall part of the slot 23, it is easy to set the shape of the concave parts 24 to a desired shape. In this case, additional components are not necessary when the flow passage part is provided in the stator 2, which can contribute to the simplification of the structure of the stator 2.

In the stator 2, the wall surfaces 25a adjacent to the concave parts 24 in the wall part of the slot 23 may contact with the coil 40 through the insulating member 50.

In the stator 2 as described above, the stator core 10 firmly supports the coil 40 even when the flow passage part is provided between the wall part of the slot 23 and the outer surface of the coil 40.

In the stator 2, the flat wire conductor 41 is stacked in layers along the radial direction orthogonal to the axial direction of the stator core 10. Here, the concave parts 24 may be opposed to each other for every layer of the flat wire conductor 41 with the thickness T41 of the flat wire conductor 41 as one unit in the radial direction.

In the stator 2 as described above, each of the concave parts 24 directly faces any of the multiple layers of the flat wire conductor 41, each layer being an individual heat source, thereby further improving the cooling efficiency.

The stator 2 according to the present embodiment includes the coil 40 of a winding of the flat wire conductor 41, and the stator core 10 having the slot 23 for housing a part of the coil 40 and formed by stacking multiple electromagnetic steel plates 10*a* together in the axial direction. The stator 2 includes the flow passage part formed on the wall part of the slot 23 and through which the coolant C flows. The concave parts 24 each having the thickness T10 of the electromagnetic steel plate 10*a* as one unit are formed on the electromagnetic steel plates 10*a*. The flow passage part includes a flow passage formed with a combination of the concave parts 24. The position, size, or number of concave parts 24 is different for each set of electromagnetic steel plates 10*a*.

In the stator 2 described above, the flow passage part is defined with the thickness T10, as one unit, of the electromagnetic steel plate 10*a* forming the stator core 10, and thus it is easy to determine the shape of the flow passage part when the stator core 10 is manufactured. Note that regarding the timing when the concave parts 24 are formed on the individual electromagnetic steel plates 10*a*, the concave parts 24 may be formed on the electromagnetic steel plates 10*a* before the stator core 10 is assembled, or the concave parts 24 may be formed after the stator core 10 is assembled. Since the position, size, or number of the concave parts 24 is different for each set of electromagnetic steel plates 10*a*, even when the multiple concave parts 24 formed in each set of electromagnetic steel plates 10*a* are combined to form the flow passage part, the extension shape of the flow passage part is not at least in a linear shape. It is thus possible to make the extension shape of the flow passage part from the inlet to the outlet for the coolant C varied along the axial direction of the stator core 10 in a reliably manner.

In the stator 2, the flat wire conductor 41 is stacked in layers along the radial direction orthogonal to the axial direction of the stator core 10. In this case, the combination pattern of the concave parts 24 may be defined with the thickness T41 of the flat wire conductor 41 as one unit in the radial direction.

In the stator 2 described above, even when the thickness T10 of the electromagnetic steel plate 10*a* is defined as one unit for the concave parts 24, it is possible to form the concave parts 24 to directly face multiple layers of the flat wire conductor 41, each of which is an individual heat source.

In the stator 2, the combination pattern of the concave parts 24 is defined by stacking the first set of multiple electromagnetic steel plates 10*a* having the same position, size, and number of concave parts 24, and the second set of electromagnetic steel plates 10*a* having the same position, size, and number of concave parts 24. Here, at least one of the position, size, or number may be different from each other between the concave parts 24 included in the first set and the concave parts 24 included in the second set.

In the stator 2 described above, for example, before the stator core 10 is assembled, it is possible to prepare in advance electromagnetic steel plates 10*a* having a shape for the first set and electromagnetic steel plates 10*a* having a shape for the second set. In this way, by preparing some sets of electromagnetic steel plates 10*a* each having concave parts 24 of a specific shape, it is then possible to combine the electromagnetic steel plates 10*a* to easily manufacture the stator core 10 including the flow passage part formed of a combination of the concave parts 24.

Stator According to a Second Embodiment

Figure 5:
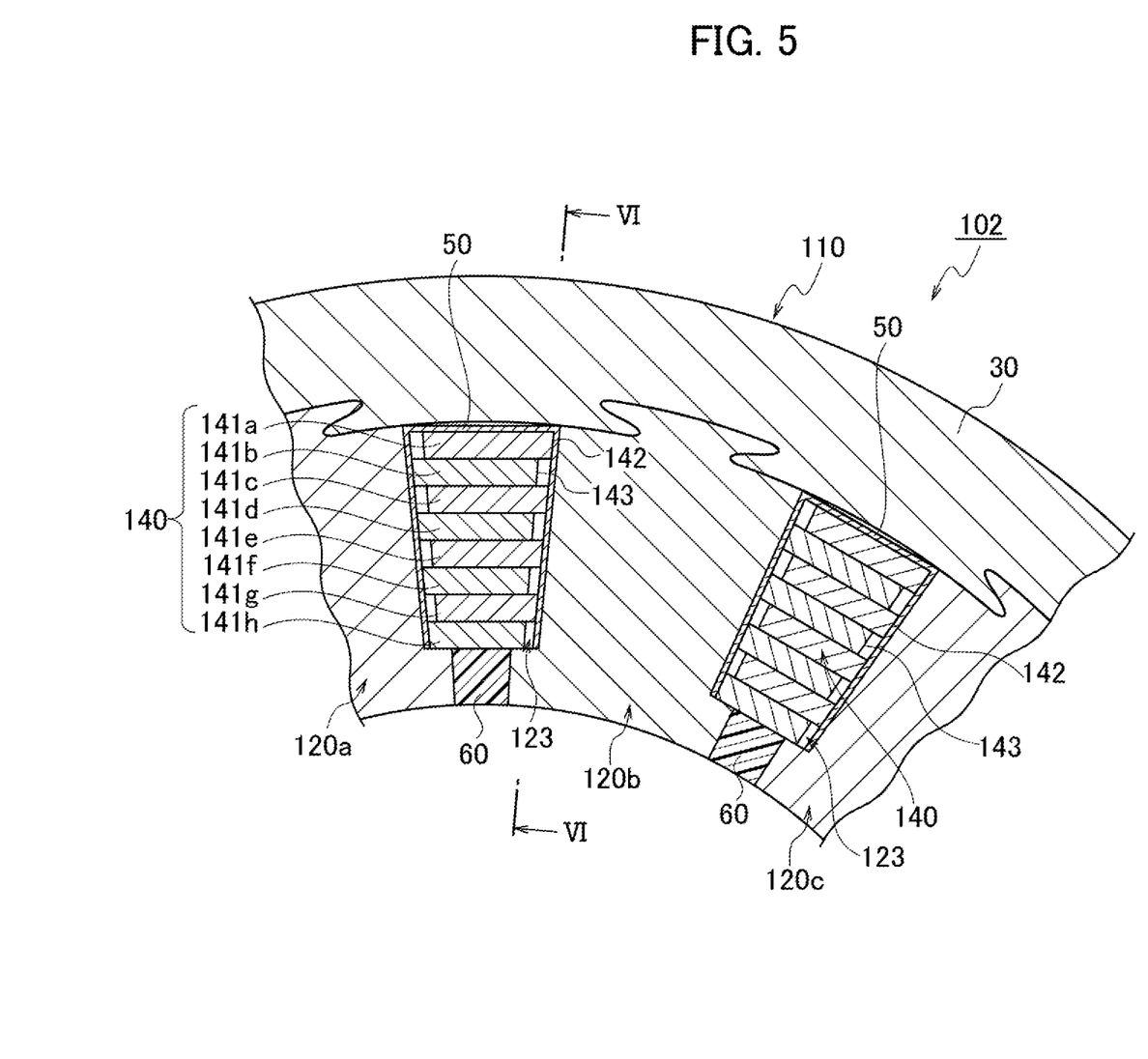
FIG. 5 is a cross-sectional view of a stator according to a second embodiment.
Figure 6:
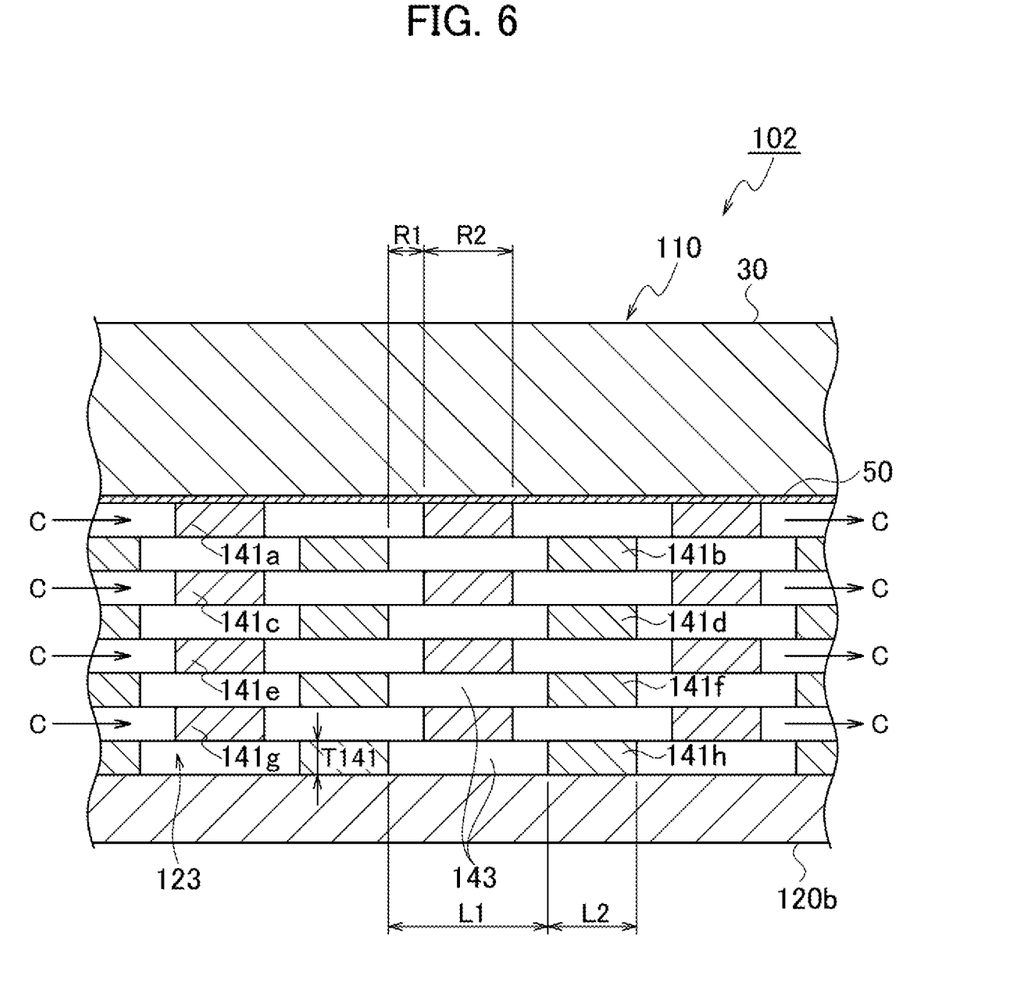
FIG. 6 is a cross-sectional view of the stator according to the second embodiment, corresponding to a VI-VI part in FIG. 5.

Next, a stator 102 according to the second embodiment is described, which can be applied to the electric motor 1 as exemplified above. FIG. 5 is a partial cross-sectional view of the stator 102 contrasted with FIG. 2 of the first embodiment, which is cut along a plane perpendicular to the axial direction. FIG. 6 is a partial cross-sectional view of the stator 102 corresponding to the part VI-VI in FIG. 5, which is cut along a plane along the axial direction and the radial direction orthogonal to the axial direction. Note that in FIGS. 5 and 6, the same components as those of the stator 2 according to the first embodiment are denoted by the same reference numerals, and the description thereof is omitted.

As with the stator 2 according to the first embodiment, the stator 102 includes, for every slot 123, a flow passage part through which the coolant C flows from one end in the axial direction facing the first annular space S1 toward the other end in the axial direction facing the second annular space S2. Also in the present embodiment, the flow passage part is provided between the wall part of the slot 123 and the outer surface of the coil 140 facing the wall part. The extension shape of the flow passage part from the inlet to the outlet for the coolant C changes along the axial direction of the stator core 110. The flow passage part in the first embodiment is concave parts 24 formed on the wall part of the slot 23. In contrast, the flow passage part according to the present embodiment is a combination of multiple concave parts 143 formed on the side surface part of the flat wire conductor 141.

The stator core 110 is a member corresponding to the stator core 10 in the first embodiment. The basic structure of the stator core 110 is equivalent to that of the stator core 10. However, as in the first teeth portion 120*a*, the second teeth portion 120*b*, and the third teeth portion 120*c* illustrated in FIG. 5, the multiple teeth portions 120 included in the stator core 110 do not have concave parts formed thereon as the flow passage part.

The coil 140 is a member corresponding to the coil 40 in the first embodiment. The flat wire conductor 141 constituting the coil 140 is stacked in layers along the radial direction orthogonal to the axial direction of the stator core 110. Here, FIG. 5 exemplifies as an example a case where the flat wire conductor 141 is stacked in a total of eight layers in one slot 123. That is, the flat wire conductor 141 includes eight layers in order from the outermost peripheral side toward the innermost peripheral side, a first layer 141*a*, a second layer 141*b*, a third layer 141*c*, a fourth layer 141*d*, a fifth layer 141*e*, a sixth layer 141*f*, a seventh layer 141*g*, and an eighth layer 141*h*. Hereinafter, the thickness of the flat wire conductor 141 is referred to as T141 (see FIG. 6).

The shape of the multiple concave parts 143 formed on the flat wire conductor 141 can be set in various ways as long as the condition that the extension shape of the flow passage part changes along the axial direction of the stator core 110 is satisfied. In the example illustrated in FIG. 6, the shape of the concave part 143 is defined according to the following criteria.

First, the multiple concave parts 143 may be defined in the stacking direction of the flat wire conductor 141 with the thickness T141 of the flat wire conductor 141 as one unit. That is, each of the concave parts 143 is formed by cutting out the side surface part of the flat wire conductor 141 along the stacking direction as a whole.

Second, in the axial direction of the stator core 110, multiple concave parts 143 may be defined by a constant length L1 with a constant interval L2 between adjacent concave parts 143. Here, the interval L2 is shorter than the length L1. As illustrated in FIG. 6, when the coil 140 is formed by winding the flat wire conductor 141, the length L1 and the interval L2 are defined such that multiple concave parts 143 are aligned in every other layer in the stacking direction from the first layer 141a to the eighth layer 141h.

Here, attention is paid to one layer (hereinafter referred to as "upper layer") and the other layer (hereinafter referred to as "lower layer"), including a part overlapped at a position adjacent to each other in the stacking direction, among the respective layers of the flat wire conductor 141. The concave parts 143 formed on the upper layer and the concave parts 143 formed on the lower layer overlap each other in the stacking direction. For example, with reference to FIG. 6, when the upper layer is the first layer 141a and the lower layer is the second layer 141b, the concave part 143 formed on the first layer 141a and the concave part 143 formed on the second layer 141b overlap each other in a first region R1. This enables the coolant C to flow in the stacking direction.

Since the flow passage changes in the axial direction, as illustrated in FIG. 6, the flow passage may include a second region R2 in which the concave part 143 of the upper layer and the concave part 143 of the lower layer do not overlap each other in the stacking direction. That is, a part of the concave part 143 of the lower layer can cover the convex part protruding toward the concave part 143 of the upper layer.

Further, the flow passage may include a pattern in which one concave part 143 of the lower layer covers multiple concave parts 143 of the upper layer.

Side surfaces 142 adjacent to concave parts 143 in the side surface part of the flat wire conductor 141, that is, side surfaces each represented by the interval L2, contact with the wall part of the slot 123 through the insulating member 50.

With the combination of the multiple concave parts 143 defined as described above, the coolant C introduced into the concave parts 143 from one side of the stator 102 in the axial direction flows toward the other side of the stator 102 in the axial direction while changing the traveling direction in a complicated manner by repeating merging and branching.

Meanwhile, the extension shape of the flow passage part in the stator core 110 from the inlet to the outlet for the coolant C can be various other than the combination of the concave parts 143 illustrated in FIG. 6.

Figure 7:
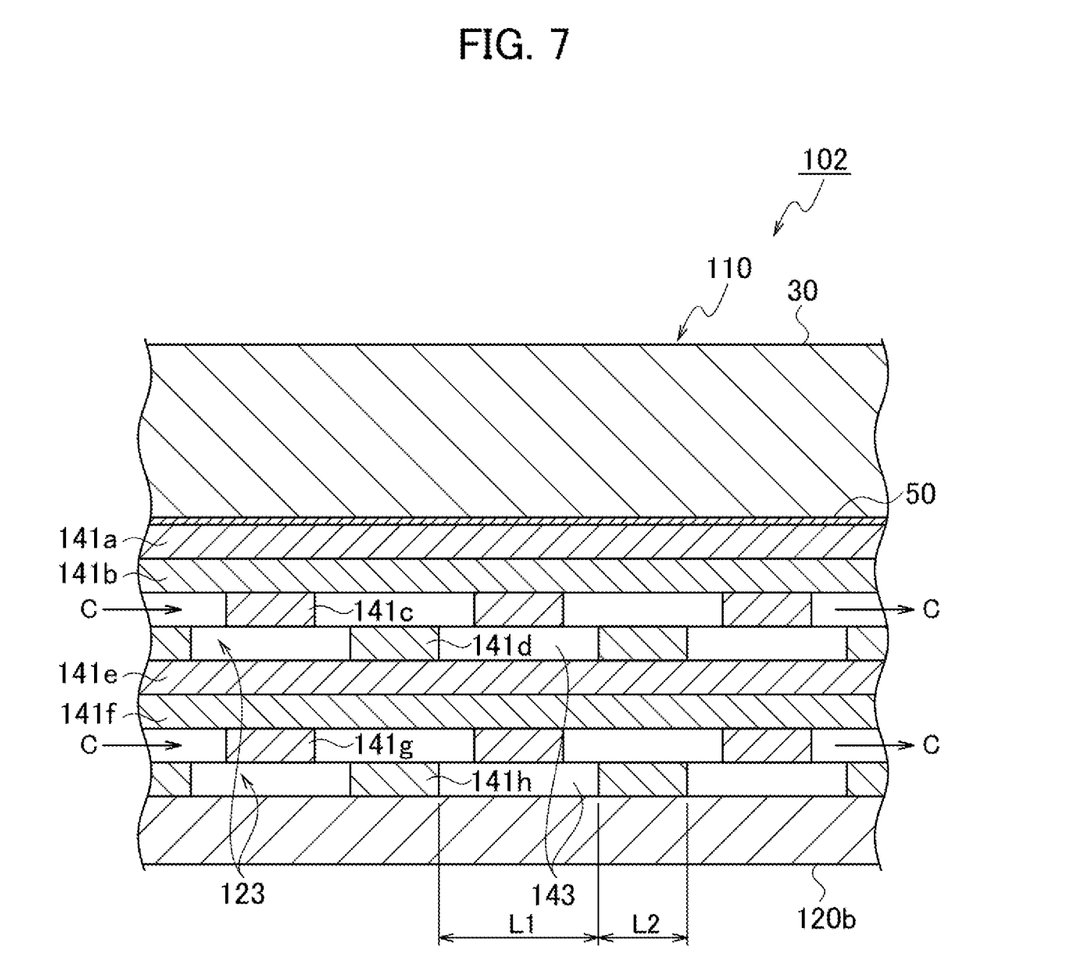
FIG. 7 is a cross-sectional view of a stator according to a modification of the second embodiment.

FIG. 7 is a diagram illustrating a combination pattern of the concave parts 143 as another example according to the present embodiment, in which the combination of the concave parts 143 illustrated in FIG. 6 is modified. Note that FIG. 7 is a partial cross-sectional view of the stator 102 in accordance with FIG. 6.

In the example illustrated in FIG. 7, in one slot 123, a section of the flat wire conductor 141 with concave parts 143 formed in the same manner as in FIG. 6 and a section of the flat wire conductor 141 with no concave parts formed are stacked on each other. Referring to the drawing of FIG. 7, in the slot 123 in the second teeth portion 120b, no concave parts are formed on the first layer 141a, the second layer 141b, the fifth layer 141e, and the sixth layer 141f of the flat wire conductor 141.

In the combination of concave parts 143 illustrated in FIG. 7, the coolant C introduced into the concave parts 143 from one side of the stator 102 in the axial direction flows toward the other side of the stator 102 in the axial direction while meandering.

As an action and effect of the stator 102 described above, it is possible to provide the flow passage part between the wall part of the slot 23 and the outer surface of the coil 40 facing the wall part, as with the stator 2 according to the first embodiment. It is possible to change the extension shape of the flow passage part from the inlet to the outlet for the coolant C along the axial direction of the stator core 110. Therefore, the present embodiment provides the stator 102 advantageous for improving the cooling efficiency.

In the stator 102, the flow passage part may be a combination of multiple concave parts 143 formed on the side surface part of the flat wire conductor 141.

In the stator 102, since the processing for providing the flow passage part is only the processing for forming the concave parts 143 on the side surface part of the flat wire conductor 141, it is easy and simple to form the flow passage part.

In the stator 102, the side surfaces 142 adjacent to the concave parts 143 in the side surface part of the flat wire conductor 141 may contact with the wall part of the slot 123 through the insulating member 50.

The stator 102 described above enables the stator core 110 to firmly support the coil 140 even when the flow passage part is provided between the wall part of the slot 123 and the outer surface of the coil 140. In this case, the flow passage part itself faces the coil 140 without the insulating member 50, which can be advantageous to further improve the cooling efficiency.

Further, in the stator 102, the flat wire conductor 141 is stacked in layers along the radial direction orthogonal to the axial direction of the stator core 110. Here, the concave part 143 may be formed with the thickness T141 of the flat wire conductor 141 as one unit in the radial direction.

The stator 102 according to the present embodiment includes the coil 140 of a winding of the flat wire conductor 141, and the stator core 110 including the slot 123 for housing a part of the coil 140. The stator 102 includes the flow passage part through which the coolant C flows, which is formed on the side surface part of the flat wire conductor 141. The flow passage part is a combination of multiple concave parts 143 formed on the flat wire conductor 141.

In the stator 102 described above, the concave part 143 has a shape in which the side surface part of the flat wire conductor 141 is entirely cut off along the stacking direction, which enables the coolant C to flow across one concave part 143 in the stacking direction. Therefore, combining multiple concave parts 143 described above makes it easy to construct the flow passage part continuous as a whole.

In the stator 102, the flat wire conductor 141 is stacked in layers along the radial direction orthogonal to the axial direction of the stator core 110. Here, in the slot 123, a section of the flat wire conductor 141 with concave parts 143 formed and a section of the flat wire conductor 141 with no concave parts formed may be stacked on each other.

With the stator 102 described above, it is possible to widen the range of choice in the shape of the flow passage part, for example, by making the shape of the flow passage part as a meandering shape as illustrated in FIG. 7.

Stator According to a Third Embodiment

Figure 8:
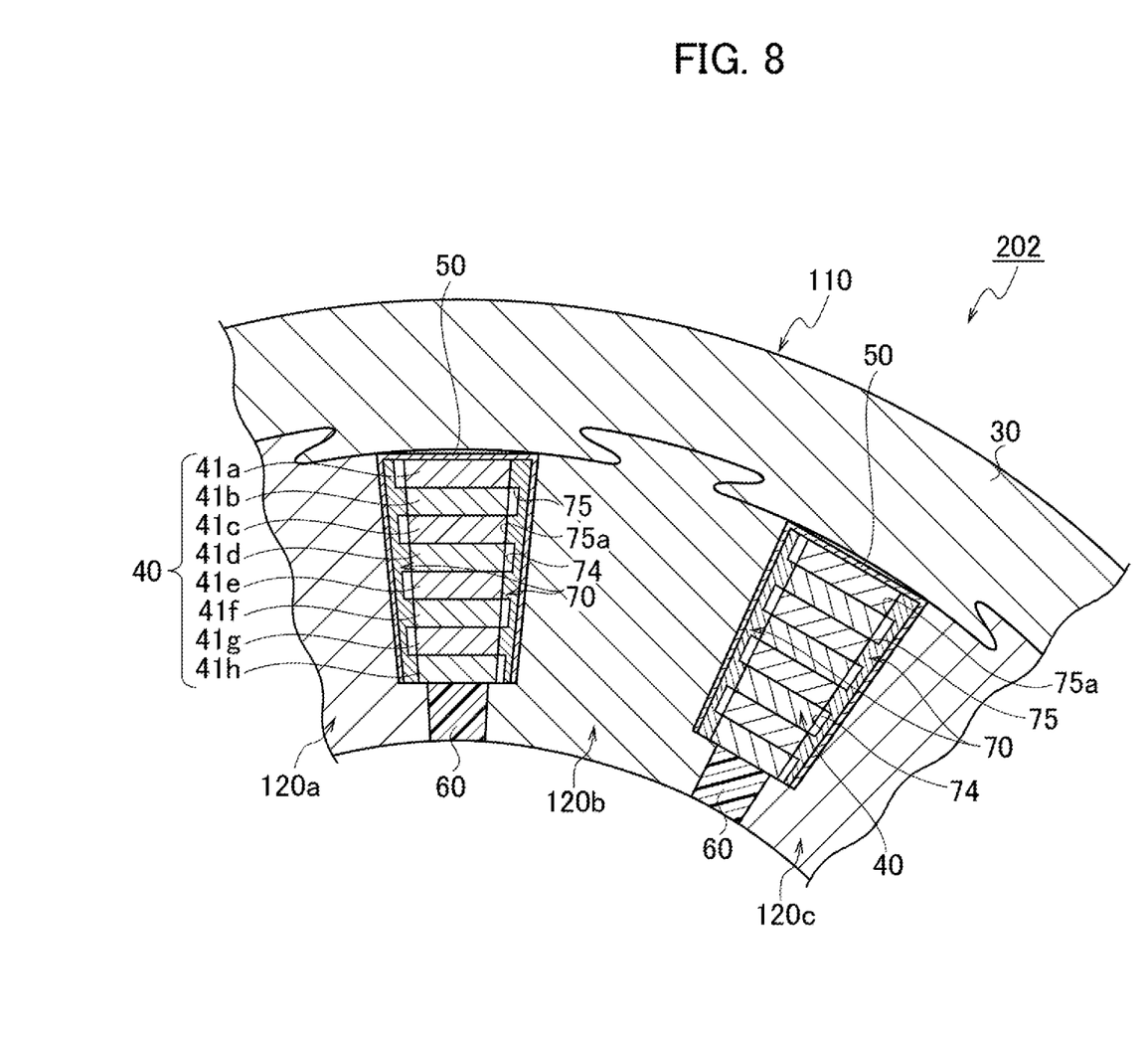
FIG. 8 is a cross-sectional view of a stator according to a third embodiment.

Next, a stator 202 according to the third embodiment is described, which can be applied to the electric motor 1 as exemplified above. FIG. 8 is a partial cross-sectional view of the stator 202 contrasted with FIG. 2 of the first embodiment or FIG. 6 of the second embodiment, which is cut along a plane perpendicular to the axial direction. Note that in FIG. 8, the same components as those of the stator 2 according to the first embodiment or the stator 102 according to the second embodiment are denoted by the same reference numerals, and description thereof is omitted.

As with the stator 2 according to the first embodiment, the stator 202 includes, for every slot 123, the flow passage part through which the coolant C flows from one end in the axial direction facing the first annular space S1 toward the other end in the axial direction facing the second annular space S2. Also in the present embodiment, the flow passage part is provided between the wall part of the slot 123 and the outer surface of the coil 40 facing the wall part. The extension shape of the flow passage part from the inlet to the outlet for the coolant C changes along the axial direction of the stator core 110. Here, the stator 202 includes for each slot 123 a spacer 70 between the wall part of the slot 123 and the outer surface of the coil 40 facing the wall part. In the present embodiment, the flow passage part is concave parts 74 formed on the outer peripheral part of the spacer 70. The combination pattern of the concave parts 74 may be, for example, the same as the combination pattern of the concave parts 24 in the first embodiment.

In the stator 202 according to the present embodiment, although the number of components increases as the spacer 70 is provided, no flow passage part is formed in the stator core 110, nor in the coil 40. Therefore, for example, the electric motor 1 as a whole can be advantageous in terms of time and labor required for manufacturing, consequently in terms of manufacturing cost.

In the stator 202, the concave parts 74 may be formed on the outer peripheral part 75 of the spacer 70, facing the outer surface of the coil 40, and outer peripheral surfaces 75a adjacent to the concave parts 74 on the outer peripheral part 75 may contact with the coil 40.

In the stator 202 described above, the concave parts 74 are formed on the outer peripheral part 75 of the spacer 70 facing the outer surface of the coil 40. Thus, the flow passage part itself faces the coil 40 without the insulating member 50, which can be advantageous in further improving the cooling efficiency. The outer peripheral surfaces 75a of the outer peripheral part 75 of the spacer 70 contact with the coil 40. Thus, it is possible for the stator core 110 to firmly support the coil 40 even when the spacer 70 is provided.

Note that in each of the above embodiments, the width W24 of the concave part 24 and the width W25 of the convex part 25 defining the shape of the flow passage part, the length L1 and the interval L2 of the concave part 143 formed on the flat wire conductor 141, or the like are constant as a whole of the flow passage part. However, in the stator 2 and the like according to the present disclosure, the dimensions of each part are not limited to those strictly defined as described above. That is, the width W24 and the width W25 may be different in each part of the combination pattern of the concave parts 24, or the length L1 and the interval L2 of the concave parts 143 may be different in each part of the flat wire conductor 141.

Although some embodiments have been described, it is possible to modify or vary embodiments based on the above disclosure. All of the components of each of the above embodiments and all of the features described in the claims may be individually extracted and combined as long as they do not contradict each other.

The entire contents of Japanese Patent Application No. 2020-086027 (filed on May 15, 2020) are incorporated herein by reference.

REFERENCE SIGNS LIST

1 Electric motor
2 Stator
3 Rotor
10 Stator core
10a Electromagnetic steel plate
23 Slot
24 Concave part
25a Wall surface
40 Coil
41 Flat wire conductor
50 Insulating member
70 Spacer
74 Concave part
75 Outer peripheral part of the spacer
75a Outer peripheral surface of the spacer
102 Stator
110 Stator core
123 Slot
140 Coil
141 Flat wire conductor
142 Side surface of the flat wire conductor
143 Concave part
202 Stator
C Coolant
T10 Thickness of the electromagnetic steel plate
T41 Thickness of the flat wire conductor
T141 Thickness of the flat wire conductor

What is claimed is:

1. A stator for an electric motor, comprising:
a coil of a winding of a flat wire conductor;
a stator core including a slot for housing a part of the coil; and
a flow passage part through which a coolant flows, provided between a wall part of the slot and an outer surface of the coil facing the wall part in a circumferential direction of the stator core, wherein
the flat wire conductor is stacked in layers along a radial direction orthogonal to an axial direction of the stator core, and
an extension shape of the flow passage part from an inlet to an outlet for the coolant changes along the axial direction of the stator core.

2. The stator for an electric motor according to claim 1, wherein
the flow passage part is a concave part formed on the wall part of the slot.

3. The stator for an electric motor according to claim 2, wherein
the wall part of the slot includes a wall surface adjacent to the concave part, the wall surface contacting with the coil through an insulating member.

4. The stator for an electric motor according to claim 2, wherein
the concave part is arranged as a plurality of concave parts, and the plurality of concave parts are opposed to each other for every layer of the flat wire conductor in the radial direction with a thickness of the flat wire conductor as one unit.

5. The stator for an electric motor according to claim 1, further comprising:

a spacer between the wall part of the slot and the outer surface of the coil facing the wall part, wherein the flow passage part is a concave part formed on an outer peripheral part of the spacer.

6. The stator for an electric motor according to claim 5, wherein the concave part is formed on the outer peripheral part of the spacer, the outer peripheral part facing the outer surface of the coil, and the outer peripheral part of the spacer includes an outer peripheral surface adjacent to the concave part, the outer peripheral surface contacting with the coil.

7. The stator for an electric motor according to claim 1, wherein the flow passage part is a combination of a plurality of concave parts formed on a side surface part of the flat wire conductor.

8. The stator for an electric motor according to claim 7, wherein the side surface part of the flat wire conductor includes a side surface adjacent to each of the concave parts, the side surface contacting with the wall part of the slot through an insulating member.

9. The stator for an electric motor according to claim 7, wherein each of the concave parts is formed with a thickness of the flat wire conductor as one unit in the radial direction.

10. An electric motor, comprising:

a stator; and a rotor configured to rotate with a magnetic field generated by the stator, wherein the stator is a stator according to claim 1.

11. A stator for an electric motor, comprising:

a coil of a winding of a flat wire conductor;

a stator core including a plurality of electromagnetic steel plates axially stacked and a slot for housing a part of the coil; and a flow passage part through which a coolant flows, formed on a wall part of the slot part in a circumferential direction of the stator core, wherein the flat wire conductor is stacked in layers along a radial direction orthogonal to an axial direction of the stator core, the electromagnetic steel plates include a plurality of concave parts formed thereon, the plurality of concave parts each having a thickness of each of the electromagnetic steel plates as one unit, the flow passage part includes a flow passage formed with a combination of the concave parts, and the concave parts are different in position, size, or number between the electromagnetic steel plates.

12. The stator for an electric motor according to claim 11, wherein a combination pattern of the concave parts is defined in the radial direction with a thickness of the flat wire conductor as one unit.

13. The stator for an electric motor according to claim 11, wherein a combination pattern of the concave parts is defined by stacking a first set of multiple electromagnetic steel plates having the same position, size, and number of concave parts and a second set of multiple electromagnetic steel plates having the same position, size, and number of concave parts, and at least one of the position, the size, or the number is different between the concave parts included in the first set and the concave parts included in the second set.

14. An electric motor, comprising:

a stator; and a rotor configured to rotate with a magnetic field generated by the stator, wherein the stator is a stator according to claim 11.

15. A stator for an electric motor, comprising:

a coil of a winding of a flat wire conductor;

a stator core including a slot for housing a part of the coil; and a flow passage part through which a coolant flows, formed on a side surface part of the flat wire conductor, wherein the flow passage part is a combination of a plurality of concave parts formed on the flat wire conductor, the flat wire conductor is stacked in layers along a radial direction orthogonal to an axial direction of the stator core, and in the slot, a section of the flat wire conductor having concave parts formed thereon and a section of the flat wire conductor having no concave parts formed thereon are stacked on each other.

16. An electric motor, comprising:

a stator; and a rotor configured to rotate with a magnetic field generated by the stator, wherein the stator is a stator according to claim 15.

* * * * *